FUNCTIONAL LIGHT-CONTROLLED GUNN OSCILLATOR

Filed Oct. 1, 1968

INVENTORS
RAYMOND SOLOMON
WILLIAM H. HAYDL

BY [signature]
ATTORNEY

United States Patent Office 3,562,667
Patented Feb. 9, 1971

3,562,667
FUNCTIONAL LIGHT-CONTROLLED GUNN OSCILLATOR

Raymond Solomon, Sunnyvale, and William H. Haydl, Tarzana, Calif., assignors to Fairchild Camera and Instrument Corporation, Syosset, N.Y., a corporation of Delaware Filed Oct. 1, 1968, Ser. No. 764,148
Int. Cl. H03b 7/06
U.S. Cl. 331—107 13 Claims

ABSTRACT OF THE DISCLOSURE

A shaped mask overlies a selected surface of a layer of light-sensitive semiconductor material capable of exhibiting negative mobility. The layer is formed so that the product of electron concentration therein times the length of path between spaced electrodes thereon is less than a value necessary for the propagation of high-field domains. When an electric field is created within the layer and light is applied to the uncovered portion of the surface, high-field domains are propagated, and high-frequency output signals are generated whose instantaneous amplitude during the time the domains are propagated is controlled by the geometry of the uncovered surface. In this manner, the geometry of the uncovered surface substantially controls the shape and frequency of the waveform of the output signal.

BACKGROUND OF THE INVENTION

Field of the invention

This invention relates to semiconductor devices, and in particular to semiconductor devices capable of exhibiting negative mobility and sensitive to illumination.

Description of the prior art

Semiconductor devices capable of exhibiting negative resistance and more particularly, negative mobility, are useful in a number of applications, such as those requiring sweep-frequency oscillations at microwave frequencies, for special waveform shaping, and in applications related to storage and logic elements. The phenomenon of negative resistance occurs when an increase in the electric field within the semiconductor material under certain conditions results in a decrease in output current, and vice versa. One well-known negative-resistance device is the Gunn diode, which uses semiconductor material having a multivalley characteristic in its conduction band. When an electrical field is applied to the diode, electrons in the conduction band tend to go from a first (central) valley to a second (satellite) valley of a higher energy level where they exhibit substantially higher effective mass and lower velocity. Because under these circumstances the electron velocity decreases in response to an increase in electric field, the electron mobility is referred to as negative.

During operation of a semiconductor device capable of exhibiting negative mobility, a region of high electric field (referred to as a domain) is periodically created at one electrode (the cathode), where it becomes detached and travels through the semiconductor material until it either becomes discharged or reaches another electrode (the anode). Several factors affect the domain as it travels between electrodes. One is the shape of the path through which the domain moves. Another is the uniformity of dopant impurities along the path. Still another is the quality and location of metal contacts. Yet another is the level of the bias voltage sustaining the domain. The domain itself substantially influences the shape and frequency of the waveform of the output signal generated by the device. In order for the device to produce an output signal that meets the requirements of particular applications, such as those of high frequency mentioned above, it is desirable to control the domain.

Several prior-art methods of domain control have been tried. In one, the geometry of the device is tapered so that the domain travels over a path of variable width. This technique is described in "Functional Bulk Semiconductor Oscillators," by Masakazu Shoji, IEEE Transactions on Electron Devices, vol. ED–14, No. 9, September 1967, pp. 535–46; in "Bulk Semiconductor High-Speed Current Waveform Generator," by Masakazu Shoji, Proceedings of the IEEE, May 1967, pp. 720–21; and in "Synthesis of Complex Electronic Functions by Solid State Bulk Effects," by C. P. Sandbank, Solid State Electronics, vol. 10, 1967, pp. 369–380.

In another technique, additional electrical contacts are located along the path of the domain. Bias voltages are selectively applied to these contacts to influence the domain, which in turn affects the shape of the output signal. For a further description of this technique, reference may be made to the above cited "Functional Bulk Semiconductor Oscillators," by Masakazu Shoji, and "Synthesis of Complex Electronic Functions by Solid State Effects," by C. P. Sandbank.

Still another method comprises selectively diffusing dopants into the body of semiconductor material to form an impurity gradient, thereby creating a nonuniform impedance path through which the domain travels. For a discussion relating to impurity gradients, reference may be made to "Small-Signal Impedance of Bulk Semiconductor Amplifier Having Nonuniform Doping Profile," by Masakazu Shoji, IEEE Transactions on Electron Devices, vol. ED–14, No. 6, June 1967, pp. 323–29; and to the above cited, "Synthesis of Complex Electronic Functions by Solid State Bulk Effects," by C. P. Sandbank.

Yet another method comprises illumination of parts of the domain path, thereby effecting changes in the conductivity profile of the device while it is in operation. This approach is described in the above cited "Synthesis of Complex Electronic Functions by Solid State Bulk Effects," by C. P. Sandbank.

As known in the art, the length of the domain path determines the period of the domain. For high-frequency operation (between 1 and 10 gigahertz), the path should be extremely short (on the order of 10 to 100 microns). However, it is difficult to manufacture semiconductor devices having accurately tapered geometries with such small dimensions. In the prior art, techniques such as masked chemical etching, air abrasion, or spark erosion have been used to vary the geometry of the device and control the domain path. Although these techniques are often satisfactory for relatively long samples (such as where the domain path is approximately 40 mils) which are capable of operation in the relatively low frequency range (such as around 100 megahertz), these techniques do not provide sufficient accuracy and thus are impractical when applied to devices that are capable of operation in the high frequency range (such as from 1 to 10 gigahertz), where the domain path is several orders of magnitude shorter (such as from 10 to 100 microns).

Moreover, using an impurity gradient approach, it is difficult during fabrication to control accurately the dopant gradient in the semiconductor body. Also, if unwanted nonuniformities arise when the impurity dopants are deposited, the domain will be adversely affected, resulting in an unwanted change in the current waveform, and harmful noise.

Furthermore, although the illumination approach to vary the conductivity profile during operation of the device is satisfactory for some applications, particularly those in the low-frequency range (such as around 100 megahertz), this approach is difficult for devices operating at high frequency. It is impractical to focus or control light on an image having a length on the order of 10 to 100 microns. Moreover, only a temporary change in the output signal is provided. For other applications it is desirable that precise control of the output signal be incorporated into the device during the initial fabrication process, thereby ensuring high accuracy over a period of time.

Thus, there is a need for a method of easily and accurately controlling the high-field domains and output signals of a semiconductor device capable of exihibiting negative mobility, particularly for high-frequency operation, such as in the range of 0.5 to 20 gigahertz. Moreover, the method should overcome the difficulties encountered with prior art devices, such as in the manufacture of very small devices having tapered geometry, and in the inaccuracies associated with the diffusion of an impurity gradient.

SUMMARY OF THE INVENTION

The structure of the invention is a substantial improvement over that of the prior art, particularly for applications in the high frequency range (such as from 0.5 to 20 gigahertz). The combination of light applied to below threshold semiconductor material capable of exhibiting negative mobility and the case of an accurately shaped mask located upon a portion of the semiconductor surface provides for precise control of the geometry of a very short domain path and, hence, of the shape and frequency of the waveform of the output signal. Furthermore, the inaccuracies and processing difficulties of the impurity gradient approach are eliminated. Fabrication of devices incorporating the structure of the invention is much easier, the mask provides a better means of controlling the output signal, there is more accurate control over properties of the device, and the shape of the output signal may have better coherence than that of the prior art. The invention has the added feature that the applied light tends to smooth unwanted fluctuations in the output signal, which are caused by nonuniformities in the dopant impurities.

Briefly, the invention comprises a layer of light-sensitive semiconductor material capable of exhibiting negative mobility and formed so that the product of electron concentration therein times the distance between spaced electrodes thereon is less than a value necessary for the propagation of high-field domains. When an electric field is created within the layer and light is applied to a selected layer surface, high-field domains are propagated and travel between spaced electrodes. An accurately shaped mask is deposited upon a portion of the layer surface, which functions to control the instantaneous amplitude of the output signal during the time the domains are propagated. In this manner, both the shape and frequency of the waveform of the output signal are controlled by the geometry of the uncovered surface. The mask comprises light-absorbing or light-reflecting material, suitably a dielectric, and is capable of being formed upon a portion of the layer surface by highly accurate deposition techniques known in the semiconductor art.

DESCRIPTION OF THE PREFERRED EMBODIMENTS

Figure 1:
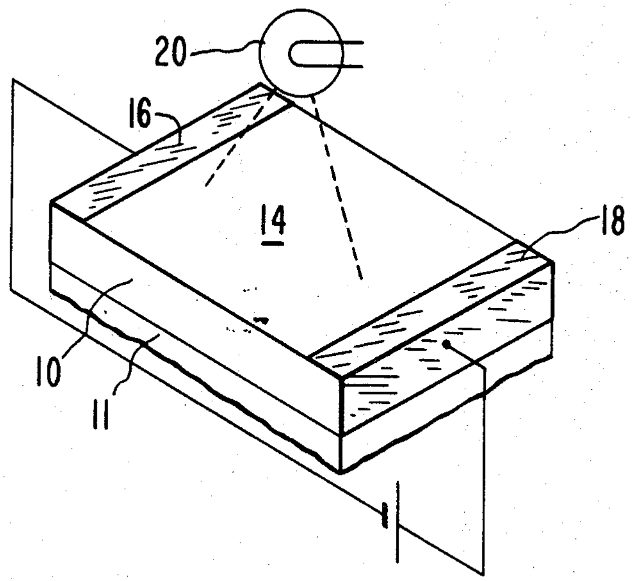
FIG. 1 is an enlarged schematic perspective view of a light-sensitive device capable of exhibiting negative resistance, with light applied to a selected surface thereof.

Referring to FIG. 1, a layer 10 of light-sensitive semiconductor material capable of exhibiting negative mobility is shown. For operating frequencies in the range of approximately 0.5 to 50 gigahertz, layer 10 is approximately 2 to 50 microns thick, approximately 5 to 200 microns wide, and approximately 2 to 200 microns long. As known in the art, a semiconductor material is light-sensitive when the average electron concentration generated by light is a substantial fraction of the electron concentration present in the conduction band in the absence of light. Also, a semiconductor material capable of exhibiting negative mobility often has a conduction band with special multivalley characteristics; more particularly, the conduction band has a low-energy (central) valley and a high-energy (satellite) valley, so that when an electron goes from the low to the high-energy valley, its effective mass is substantially increased and its velocity is substantially decreased, while if an electron goes from the high to the low-energy valley, the reverse occurs. For a further description of this effect, reference may be made to "Theory of Negative Conductance, Amplification, and of Gunn Instabilities in 'Two Valley' Semiconductors," by D. E. McCumber and A. G. Chynoweth, IEEE Transactions on Electron Devices, vol. ED–13, January 1966, pp. 4–21; and also to "Non-Linear Space Charge Domain Dynamics in a Semiconductor with Negative Differential Mobility," by H. Kroemer, IEEE Transactions on Electron Devices, vol. ED–13, January 1966, pp. 27–40. Any light-sensitive semiconductor material capable of exhibiting negative mobility may be used in the invention, and preferably the material should be capable of high-frequency operation. Material selected from the group consisting of gallium arsenide, gallium arsenide phosphide, indium arsenide, indium phosphide, cadmium telleride, and zinc selenide is particularly suitable. For purposes of describing the invention, however, reference is made throughout to single-crystal gallium arsenide, although other materials may be substituted.

Suitably, the semiconductor layer 10 may be formed using epitaxial techniques, with the layer 10 supported by a substrate 11 of insulating, semi-insulating, or semiconductor material. Using gallium arsenide for the semiconductor layer 10, appropriate impurities, such as tin, tellurium, or selenium, are then selectively deposited into the layer 10. The dopant concentration is controlled so that the product of electrons available for conduction (electron concentration in the conduction band of semiconductor layer 10) times the length between electrodes of the domain path is less than a minimum value necessary for the propagation of high-field domains. It is believed that this threshold value is approximately 1 to $5\times10^{11}$ cm.$^{-2}$. For a length of path of 20 microns, the doping concentration should be approximately $5\times10^{13}$ to $2.5\times10^{14}$ dopants per cubic centimeter.

In order to create an electric field within the layer 10, a pair of spaced metal electrodes 16 and 18 are provided, with a distance between them, for example, of approximately 5 to 200 microns. Electrodes 16 and 18 are ohmically connected to the semiconductor layer 10. Typically, the electrodes may comprise evaporated gold-germanium.

Operation of the device begins by applying a bias voltage of approximately 8 volts to electrodes 16 and 18 and thereby creating an electric field of approximately 4 kilovolts per centimeter across the 20-micron layer 10. Because the electron concentration within the layer 10 times the length of domain path between electrodes 16 and 18 is not greater than a minimum value of approximately 1 to $5\times10^{11}$ cm.$^{-2}$, no high-field domains are propagated. That is, with the invented device, the bias voltage alone is not sufficient to cause domain propagation. However, domain propagation commences when light is applied to the exposed surface 14 of layer 10. Typically, the light may be radiant energy, such as visible light, X-rays, or ultraviolet rays. For gallium arsenide, it is desirable that the light used comprise wave lengths of about 0.9 micron or less. Suitably, a source 20 may be used to generate the light. A particularly convenient light source comprises a solid state (semiconductor) light-emitting diode, formed of such material as gallium arsenide, gallium arsenide phosphide, or gallium phosphide. Sufficient energy from photons in the impinging light is transferred to electrons in the valence band to cause them to jump over to the conduction band where they are available for conduction. When the quantity of conduction band electrons is increased until the product of electron concentration ($n$) times the length of domain path ($l$) is not less than the minimum level of approximately 1 to $5\times10^{11}$ cm.$^{-2}$, periodic high-field domains are propagated.

For the purposes of description, electrode 16 may be designated as the cathode and electrode 18 as the anode. In normal positive-resistance semiconductor material, that is, where an increase in the electric field causes an increase in current, electrons move in response to the field direction away from a negative electrode and toward a positive electrode, usually with a speed referred to as the drift velocity. As the electrons move, they tend to disperse, partly because the electrons are of the same negative charge and tend to repel each other.

By comparison, when a bias is applied to a semiconductor capable of exhibiting negative mobility, electrons emitted from the cathode tend to pile up as they scatter from the central valley into one of the high-mass satellite valleys. The region of piled up negative charge is referred to as an accumulation region (indicated by the minus signs on FIG. 2). Because inhomogeneities are always present in a real crystal, a depletion region (indicated by the plus signs on FIG. 2) builds up in front of the accumulation region, the two forming a dipole region which moves from cathode to anode in response to the applied field. Since there is a large increase in electric field across the travelling dipole region, it is often referred to as the high-field domain.

Figure 2:
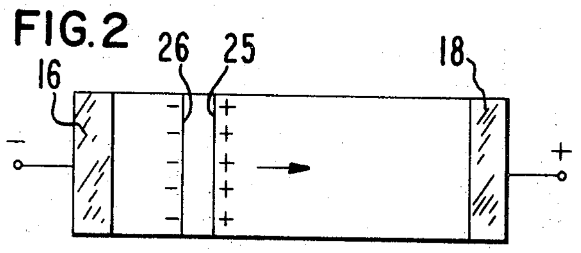
FIG. 2 is an enlarged schematic view of a selected surface of the device, with a pictorial representation of a travelling, high-field domain.

Referring to FIG. 2, the region of the high-field domain is represented by lines 25 and 26, which indicate that the domain has become detached from the cathode 16 and is moving toward the anode 18.

Once a domain is launched, the field necessary to sustain domain motion (called the sustaining field) is considerably less than field needed to nucleate a domain. If the field is not uniform, due either to a geometric or concentration gradient wherein the field at some point in the layer 10 drops below the sustaining value, the domain may be extinguished before it reaches the anode 18.

Figure 3:
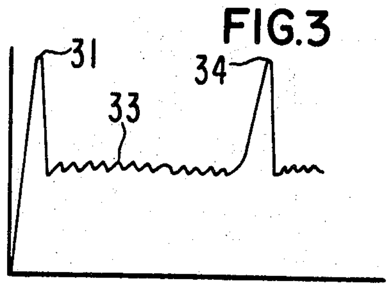
FIG. 3 is a representation of a typical shape of the output current waveform for the device of FIG. 2.

Referring to FIG. 3, the typical shape of an output current waveform is shown when the domain path has approximately the same width throughout. Here we see an initial spike 31 when the domain is created at the cathode 16 of FIG. 2. As the domain is launched, the output current then falls to a relatively constant value 33, which is determined by the bias voltage on electrodes 16 and 18. This constant value is maintained until the domain either reaches the anode 18, or is extinguished along the path. At this time a new domain is generated, and the output current reaches another peak value 34. As indicated in FIG. 3, the current waveform undergoes a substantial change. For the constant-width domain path of FIG. 2, a change in the domain occurs when it is initially launched at the cathode 16, and the current waveform assumes the shape of a spike 31. This characteristic is referred to as a spiking mode behavior. Thereafter, the domain reaches a mature state; that is, no substantial change occurs in the width of the domain path or in the electron concentration until the domain is extinguished.

Figure 4:
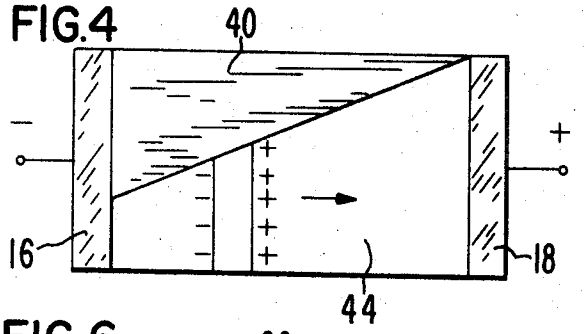
FIG. 4 is an enlarged schematic view of one embodiment of the invention, wherein a light-sensitive device capable of exhibiting negative resistance has one portion of a selected surface covered by a shaped, variable-width mask and another surface portion uncovered, with a high-field domain pictorially represented as travelling along the uncovered surface.

Referring to FIG. 4, a shaped mask 40 is located upon a portion of the surface 14 (FIG. 1), leaving another portion 44 uncovered. The shaped mask 40 may have a variable width and comprises a light-absorbing or light-reflecting material. Moreover, a masking material capable of being formed upon portions of the selected surface using highly accurate deposition techniques known in the semiconductor art is preferred. For example, with visible light, masking accuracy to within approximately 2.5 microns can be obtained. Use of ultraviolet light gives a masking accuracy to within approximately 1 micron. Even higher resolution is obtained using an electron-beam exposure, being of the order of approximately 0.25 to 0.5 micron. In this way, highly accurate masking shapes can be obtained by semiconductor techniques. Dielectrics such as black glass, lead glass, plastic, or a combination of these are suitable as masking material. However, a light-absorbing or light-reflecting metal (such as aluminum), semiconductor (such as silicon), or insulating material may be used. With a metal or semiconductor mask, insulation from the semiconductor layer 10 (FIG. 1) should be provided.

Figure 5:
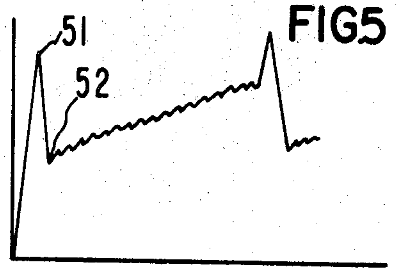
FIG. 5 is a representation of a typical shape of the output current waveform for the embodiment device of FIG. 4.

When light is applied to the layer 10, the average electron density is increased above threshold value only over that portion of the semiconductor layer underlying the uncovered surface 44. Thus, with a shaped mask of variable width, a domain travels between electrodes 16 and 18 on a path having a continually changing width. Because the domain must continually adjust to this changing path width, the mature state cannot be reached. As the path width increases, the field across the domain decreases. The output current also changes in response to the changing domain, as shown in FIG. 5. Because of the negative-mobility characteristic of the semiconductor material, a decrease in the field within the domain causes an increase in the current, and vice versa. Referring to FIG. 5, after the initial spike 51, which is generated when the domain is launched at the cathode 16, the output current falls to a low level 52 after the domain has left the cathode 16, because when the path width here is narrow and the field is high. The output current level becomes progressively higher as the domain approaches the anode 18, because the path width is greater and the domain field is lower.

Figure 6:
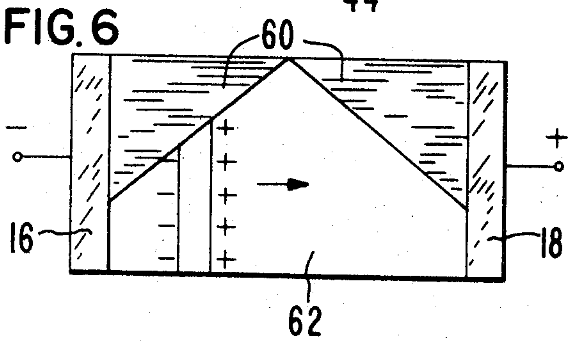
FIG. 6 is an enlarged schematic view of another embodiment of the invention, wherein a selected surface of the overlying mask has a different shape from that of FIG. 4.

Referring to FIG. 6, a shaped mask 60 of a different form from that of FIG. 4 covers a portion of the layer 10 surface, leaving another portion 62 uncovered. Here, the variable-width domain path is narrow near the cathode 16, wider midway between the two electrodes 16 and 18, and narrow again near the anode 18. A domain traversing this path has a high field near the cathode 16, a low field at the midway point, and a high field near the anode 18.

Figure 7:
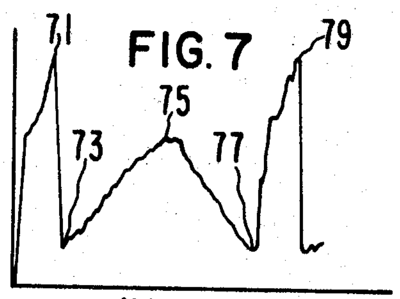
FIG. 7 is a representation of a typical shape of the output current waveform for the embodiment of FIG. 6.

A typical current waveform for the device of FIG. 6 is shown in FIG. 7. One can observe an initial peak 71, a low point 73, a higher midway point 75, and another low point 77. When another domain is generated, the second spike 79 appears. Note that if the bias voltage applied to electrodes 16 and 18 is not sufficiently large to sustain a domain throughout the length of the path, then the domain becomes extinguished somewhere along the path and a new domain is generated. Thus, by changing the level of the bias voltage, one may adjust the frequency of the output signal, and obtain a voltage-tuned oscillator.

The invention has been described with reference to particular embodiments, which provide the preferred approach for applications calling for operation in the high frequency range (on the order of 0.5 to 20 gigahertz). However, the concept of the invention may be extended to other applications by one skilled in the art. Moreover, depending upon the application, alternative embodiments may be incorporated without departing from the concept of the invention. For example, the overlying mask may have any shape or pattern desirable, thereby providing great flexibility in the shape of the current waveforms that can be generated. A mask may be used that allows for easy change. Also, suitable masking can comprise multilayer materials. Furthermore, for special applications, the mask may be movable rather than fixed, having translational or rotational motion, or both. Moreover, the mask may have variable absorptivity or reflectivity or both. In addition, the absorptivity or reflectivity may be voltage controlled. One may also selectively vary the electric field between the anode and the cathode. These techniques and other may be used separately or together and in conjunction with a light-sensitive semiconductor device capable of exhibiting negative mobility and having an accurately shaped mask overlying a portion of the surface to control the shape and frequency of the waveform of the output signal without departing from the scope of the invention.

What is claimed is:

1. Apparatus comprising:

a layer of light-sensitive semiconductor material capable of exhibiting negative mobility and formed so that the product of electron concentration therein times the distance between spaced electrodes thereon is less than a value necessary for the propagation of high-field domains;

a pair of spaced electrodes coupled to the layer for applying an electric field through at least a portion of the layer;

the improvement comprising a shaped mask overlying a portion of a selected surface of the layer while having another portion of the selected surface exposed, so that when light of suitable intensity is applied to the selected surface, high-field domains are propagated and an output signal is generated whose instantaneous amplitude during the time the domains are propagated is controlled by the shape of the uncovered selected surface, whereby the shape of the uncovered surface controls the shape and frequency of the waveform output signal.

2. Apparatus as recited in claim 1 wherein the mask comprises a variable width.

3. Apparatus as recited in claim 2 wherein the mask adheres to a portion of the surface.

4. Apparatus as recited in claim 3 wherein the mask comprises a deposited material.

5. Apparatus as recited in claim 4 wherein the mask comprises a dielectric.

6. Apparatus as recited in claim 1 wherein the mask comprises a light-absorbing material.

7. Apparatus as recited in claim 1 wherein the mask comprises a light-reflecting material.

8. Apparatus as recited in claim 1 wherein the layer comprises epitaxial material, the device further defined by a substrate supporting the layer.

9. Apparatus as recited in claim 8 wherein the semiconductor layer comprises a compound selected from the group consisting of gallium arsenide, gallium arsenide phosphide, aluminum arsenide, indium phosphide, cadmium telluride, and zinc selenide.

10. Apparatus as recited in claim 9 wherein a substantial portion of the semiconductor layer comprises gallium arsenide, whereby high-frequency output signals are generated.

11. Apparatus as recited in claim 1 wherein the product of electron concentration times domain path is less than approximately $5\times10^{11}$ cm.$^{-2}$.

12. Apparatus as recited in claim 1 further defined by a plurality of spaced electrodes coupled to the layer.

13. Apparatus as recited in claim 1 wherein the distance between spaced electrodes is approximately 5 to 200 microns so that the operating frequency is from approximately 0.5 to 20 gigahertz.

References Cited

UNITED STATES PATENTS

| | | | |
|---|---|---|---|
| 3,435,307 | 3/1969 | Landauer | 331—107 |
| 3,462,617 | 8/1969 | Shoji | 331—107 |

JOHN KOMINSKI, Primary Examiner

U.S. Cl. X.R.

317—234; 331—66